INVENTORS:
VOLKER GRÖBE ET AL 3,520,661
APPARATUS FOR SOLVENT POLYMERIZATION
Volker Gröbe, Joachim Ulbricht, Hans W. Reichert, and Heinz P. K. Fark, Teltow-Seehof, Edeltraud E. Buchmann, Saalfeld, Ulrich E. E. Hertel, Rathenow, Dieter A. K. Köpcke and Walter K. Michaelis, Brandenburg, Eberhard P. H. Peter, Premnitz, Joachim G. Aurich and Eberhard W. Roth, Dessau, Alfred A. Bender, Wolfen, and Karl H. Bernhardt, Landsberg, Bezirk Halle, Germany, assignors to VEB Chemiefaserwerk Friedrich Engels, Premnitz, Kreis Rathenow, Germany
Filed Apr. 18, 1966, Ser. No. 543,187
Int. Cl. C08f 3/74; F28f 9/22
U.S. Cl. 23—283      2 Claims

ABSTRACT OF THE DISCLOSURE

The continuous polymerization of polymerizable substances in solvents, is carried out in a reactor for the passage and reaction of the monomers, a plurality of cooling elements arranged in groups transversely to the flow of the monomers and alternating with spaces free of cooling elements. The apparatus is particularly advantageous because it eliminates the need of stirring and prevents the backward mixing caused by stirring.

---

The invention relates to a process and apparatus for the continuous polymerization of polymerizable compounds in solvents, which, in each case simultaneously dissolve the monomer and the polymer, preferably for flowinstable systems, such as the systems of acrylonitrile-dimethylformamide or acrylonitrile-dimethylsulfoxide.

The flow instability of a polymer system is characterized by a density gradient S which is defined as follows:

$$S = \frac{\frac{W \cdot \beta}{c}}{\rho_o \left[ \frac{1}{\rho_M} - \frac{1}{\rho_D} \right]}$$

wherein:

W = reaction heat (kcal./kg.)
c = specific heat (kcal./kg. grd.)
$\beta$ = volume expansion factor (1/grd.)
$\rho_M$ = density of the monomer (kg./m.$^3$)
$\rho_p$ = density of the polymer (kg./m.$^3$)
$\rho_o$ = density of the mixture within the referred range (kg./m.$^3$) (often about equal to the density of the solvent)

In the above list of symbols, "grd." stands for degree regardless of the temperature scale used, which is irrelevant. In case $S<1$, the system is flow-stable, whereas it is instable in case of $S>1$. For the system of acrylonitrile-dimethylformamide the density gradient S is calculated $\approx 4$. That is to say that this system is absolutely flow-instable.

A continuous process for the solution polymerization in a flow tube is known in which the reaction mixture enters in a laminar form through a distributing device at the wall of the tube.

Therefore a formation of layers and a disturbance of the ever-increasing conversion in flowing direction is avoided. It is also known that the polymerization has been carried out in stirring vessels equipped with internal cooling elements. Furthermore, processes have been described in which in a cascade of stirring vessels the catalyst is added to the various containers of the cascade in the course of the continuous process. The continuous solution polymerization is limited—because of the limited possibilities of heat transmission—to tube diameters which for a large production capacity would require a large uneconomical number of apparatuses in parallel arrangement working simultaneously. Furthermore, the choice of tube diameters is limited because of a possible backward mixing. This is mainly due to the uplift of the liquid caused by reaction heat set free. As a consequence of that backward mixing, layers of the liquid are formed which cause periodical variations of the properties of the reaction product leaving the apparatus, thus disturbing the continuous processing. The polymerization in stirring vessels avoids the formation of clearly defined liquid layers, but increases backward mixing so that larger reaction spaces are necessary than in case of polymerization in the flow tube. Another disadvantage of the backward mixing in stirring vessels is the decreasing speed of polymerization. The continuous polymerization in a cascade of stirring vessels with gradual addition of the catalyst facilitates the dissipation of the reaction heat, but it requires additional arrangements for the dosage of the catalyst. All these devices are characterized by a need for additional electric energy which has then to be eliminated in the form of heat from the reaction areas.

It is an object of this invention to provide a process and an apparatus which permits the elimination or reduction of the variations of the properties of the solution leaving the reaction area.

It is a further object of the invention to provide a process and an apparatus for the continuous polymerization in solvents whereby it is possible to eliminate the reaction heat without the application of energy for stirring to obtain a product having uniform properties.

Further objects and advantages of the invention will become apparent from the following detailed description. The above objects, according to the invention, are realized by the continuous introduction of the reaction mixture in a shaftlike polymerization reactor composed of several stages and containing installed across the main flow direction, cooling elements such as pipes or ribbed pipes. The installed elements should preferably be arranged in rows, each row disposed in a single plane. The distances between these cooling surfaces may be varied in the flow direction depending on the quantity of the reaction heat set free and on the viscosity. The distance of the pipes in one assembly should preferably be less than double their diameter. This arrangement of the cooling elements permits the dissipation of heat from the reaction area without stirring energy and without the backward mixing caused by the stirring.

According to the invention, the cooling elements provided for the process in the polmerization reactor are arranged in such a manner that the volume of the apparatus is divided in the main flow direction in layers alternately densely charged by cooling installations and free of such installations, respectively. The pipes or other cooling elements within one installation group are then preferably placed in a staggered arrangement. The preferable distance should be less than double their diameters. Due to this arrangement, zones of different temperatures are formed in the longitudinal direction of the reactor. Thus it is achieved that the layers forming in the reaction liquid remain limited as to their extension to a height which depends on the distance of the several cooling installation groups. In reactors having large height, the residence time corresponding to a group of installations can be kept so small that a product of almost constant properties is obtained. The same result is also obtained if layers of densely arranged installations alternate with such of less densely arranged installations. According to the invention, flow stabilizers may be installed between the tube surfaces or installation groups so as to divide the space of cooling surfaces into flow cells parallel to the main flow direction. These cells can also be connected with each other. These flow stabilizers consist of sheets or ridges of a material having high heat conductivity. Furthermore, parallel sheets or foils are installed as flow stabilizers vertically to the pipe surfaces or installation groups, between their pipes and passing through a number of these pipe surfaces or installation groups.

The invention will now be more fully described with reference to the accompanying drawings in which:

FIG. 1 is a central sectional view through the reactor;
FIG. 2 is another embodiment of the cooling tube arrangement;
FIG. 3 is a view similar to FIG. 1 illustrating the flow stabilizers between groups of cooling tubes;
FIG. 4 is a section along line 4—4 of FIG. 3 showing the stabilizer arrangement as seen from the top of the inside of the apparatus; and
FIG. 5 is yet another embodiment of the tube arrangement in the reactor and flow stabilizers arrangement in the reactor.

Referring now to FIG. 1, 1 generally designates a polymerization reactor seen inside; the reactor comprises parallel cooling tubes 2 arranged in groups of superposed rows in staggered relationship and with empty spaces 3 therebetween. In this embodiment of the apparatus, the upper half has the tubes arranged extending in a direction at an angle of about 90° with respect to the direction in which the tubes 4 of the bottom half are disposed. These tubes, too, are arranged in parallel rows in two groups leaving a space 5 empty.

A jacket 6 is shown visible in the bottom part of the apparatus only, through which the cooling water circulates and into which all the tubes empty. At 7 a supply pipe for the monomer entering the reactor and at 8 a discharge pipe for the polymer are shown, respectively.

FIG. 2 shows a difference embodiment, in which groups of staggered tube rows 9 alternate with single rows of tubes 10, with empty spaces 11 provided between the groups of tubes. For admission of the monomer, tube 12 is serving, while tube 13 is provided for discharge of the polymer.

FIG. 3 is an embodiment similar to the one shown in FIG. 1 with the bottom portion partly broken away. In the upper half of the reactor, tubes 14 are arranged in parallel in two groups in staggered relationship, and flow stabilizers 15 are shown in the space between the groups. The bottom portion again illustrates a plurality of tubes 16 extending in a direction at an angle of 90° with respect to that of tubes 14. A jacket for circulation of cooling water is partially shown at 17, an inlet pipe for the monomer at 18.

Figure 1:
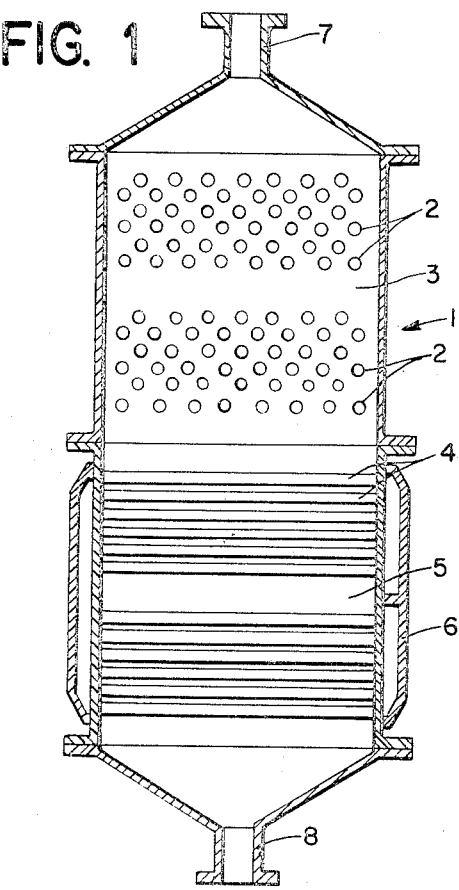
Figure 2:
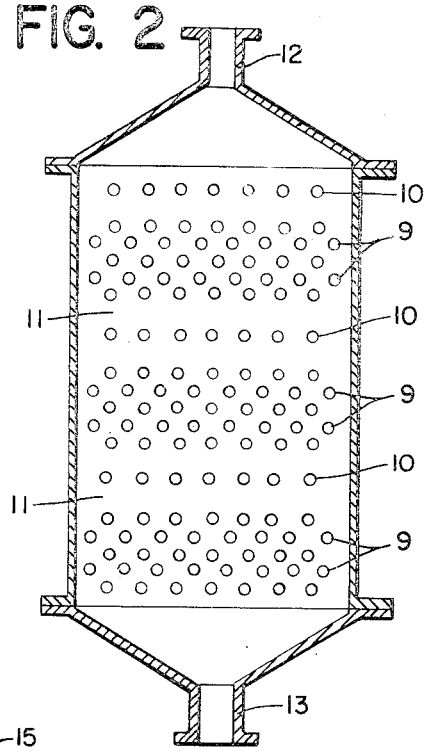

It should be understood, that the drawing only shows embodiments of the reactor by way of exemplification and not of limitation. For instance any desired number of sections may be superposed in the reactor, when this is desired, e.g. in reactors of considerable height.

The invention will now be more fully explained in a number of examples, but it should be understood that these are given by way of illustration and not of limitation and that many changes in the details can be made without departing from the spirit of the invention.

EXAMPLE 1

Into the vertical reaction shaft 1 as shown in FIG. 1, we continuously feed from above a mixture of 24 parts of acrylonitrile, 2 parts of methacrylic acid ester, 0.5 part of acrylic acid, 0.1 part of ammonium persulphate and 74 parts of dimethylformamide. Through water passing through the tubes, cooling is maintained at a temperature of 39° C. The speed at which the reaction mixture is made to pass through is set so that the residence time is 30 hours. After that time, a conversion of 73% of the monomer to the polymer is obtained. The viscous solution is continuously pumped off at the lower part of the shaft; the variation of yield is less than 2–3%. The polymer solution can be processed, e.g. spun, immediately or after the elimination of the unconverted monomer, which may be effected by any known method, e.g. by vacuum-evaporation.

EXAMPLE 2

Figure 3:
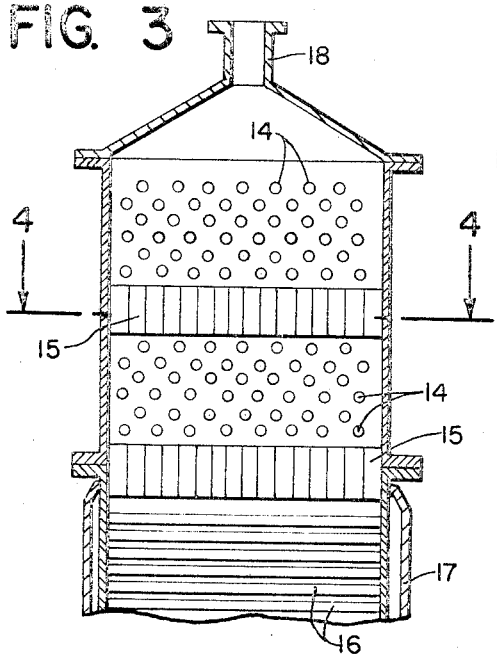
Figure 4:
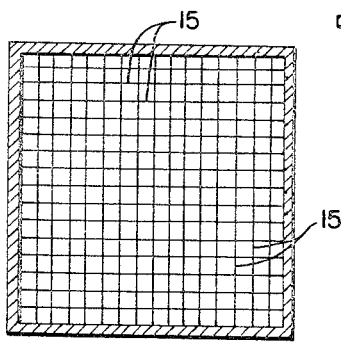
FIG. 4 is a section on line 4—4 of FIG. 3 and shows the network of flow stabilizers 15.
Figure 5:
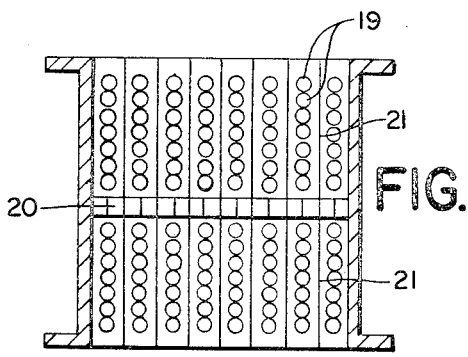
FIG. 5 is a partial showing of the tube arrangement within the polymerization reactor wherein tubes 19 are placed in straight rows. Flow stabilizers are illustrated at 20 and 21.

The apparatus described in FIG. 3 is fed with a mixture of 18 parts of acrylonitrile, 1.5 parts of acrylic acid ester, 0.2 part of allyl sulphonate, 0.2 part of azo-diisobutyronitrile and 79 parts of dimethylsulphoxide. The cooling agent is maintained at a temperature of 40° C. The residence time of the reaction mixture in the apparatus is 25 hours, and the conversion rate obtained is 75%.

With the process according to the invention it has for the first time been possible to polymerize flow-instable systems, such as acrylonitrile-dimethylformamide, in a continuous process with a space-time yield better than in apparatuses with stirring equipment, and without the disadvantage of uncontrolled formation of layers, as it occurs in the flow tube. The backward mixing is limited to an extent which does not require essential increase of the reaction volume or the cooling surface per unit volume of the reaction space as compared with the polymerization in the flow tube.

While in the specific examples we have described the invention with reference to the polymerization of acrylonitrile with dimethylformamide and dimethylsulphoxide, respectively, it should be understood that the method according to the invention is generally applicable to flow-instable systems and the attached claims should be understood accordingly.

What we claim is:

1. An apparatus for use in the continuous polymerization of flow-unstable solution polymerization systems comprising a reactor for the passage therethrough of monomeric reaction components in an oriented direction of flow, an inlet provided at one end of said reactor for itroducing monomeric reaction components and solvent into said reactor, an outlet at the other end of said reactor for discharging the products of polymerization, a plurality of cooling units arranged in at least two groups disposed in said reactor transversely to the main flow direction, each of said groups of cooling units being spaced from adjacent groups of cooling units by an expanse of reactor entirely free of any cooling units and flow stabilizers in the form of a narrow mesh grid being arranged between adjacent groups of cooling units.

2. Apparatus according to claim 1 wherein said flow stabilizers consist of parallel sheets and are vertically disposed between the cooling units so as to extend through more than one of said groups of cooling units.

References Cited

UNITED STATES PATENTS 2,714,101   7/1955   Amos et al. _____ 23—285 XR
2,727,884   12/1955   McDonald et al. __ 23—285 XR
3,316,064   4/1967   Kuzuoka et al. _____ 23—283

JAMES H. TAUMAN, JR., Primary Examiner

U.S. Cl. X.R.

165—159; 260—88.7, 93.5, 95